UNITED STATES PATENT OFFICE.

OTTO BREDT, OF BARMEN, GERMANY.

MANUFACTURE OF RED COLORING-MATTER.

SPECIFICATION forming part of Letters Patent No. 289,613, dated December 4, 1883.

Application filed June 12, 1882. (Specimens.) Patented in Germany March 28, 1882; in Austria-Hungary April 3, 1882; in England April 12, 1882, No. 1,730; in Belgium April 29, 1882, No. 57,585, and in France June 27, 1882, No. 148,426.

*To all whom it may concern:*

Be it known that I, OTTO BREDT, of Barmen, in the Kingdom of Prussia and Empire of Germany, have invented certain new and useful Improvements in Red Dye-Stuffs, (for which Letters Patent have heretofore been granted to me by the Government of Great Britain under date of April 12, 1882, No. 1,730; by the Government of Belgium under date of April 29, 1882, No. 57,585; by the Government of France, dated June 27, 1882, No. 148,426; in Germany, dated March 28, 1882, and in Austria-Hungary, dated April 3, 1882, not yet numbered,) of which the following is a specification.

This invention has reference to the manufacture of red dye-stuffs or coloring-matter, called "Barmen Scarlets," which are to be used in the printing and dyeing of textile fabrics; and the invention consists of producing a red dye-stuff by first diazotizing naphthylamine sulphonic acid, and then treating the azotated substance with naphthol.

The preparation with red dye-stuff is carried out in the following manner: Naphthylamine is heated with five times its quantity of concentrated sulphuric acid to 120° centigrade until a stiff grayish-white mass is formed. The surplus of sulphuric acid present is removed from the naphthylamine sulphonic acid by washing. Ten kilograms of this naphthylamine sulphonic acid are then dissolved in water and caustic soda. To this solution are added 1.95 kilograms of beta-naphthol in caustic soda and a solution of 2.856 sodic nitrite in water. After intimately mixing these substances concentrated hydrochloric acid is added until the liquid reacts slightly acid. The dye-stuff is then precipitated by common salt and purified by filtration and washing. The dye-stuff so obtained is of a brownish-red color when dried, and dissolves in concentrated sulphuric acid with a violet-blue color.

The chemical constitution may be represented by the following formula:

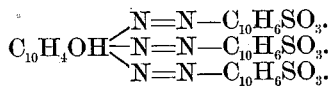

It will be observed that three hydrogen atoms of naphthol have been substituted by three groups of azotated naphthylamine sulphonic acid, and thereby a new product obtained, to which the name of "naphtholtrisazonaphthalin sulphonic acid" may be given.

As naphthylamine occurs in two isometric modifications, both the alpha and beta form of naphthylamine sulphonic acid may be employed in the manufacture of my improved red dye-stuff, the alpha form yielding bluish-red and the beta form yellowish-red shades.

Having thus described my invention, I claim as new and desire to secure by Letters Patent—

1. The process herein described of producing red dye-stuffs or coloring-matters, which consists in diazotizing naphthylamine sulphonic acid, and then treating it with naphthol, substantially as set forth.

2. The new red or scarlet coloring-matter produced by the process herein described.

In testimony that I claim the foregoing as my invention I have signed my name in presence of two subscribing witnesses.

OTTO BREDT.

Witnesses:
　CARL FERIÉ,
　EDUARD KNEIDEL.